United States Patent [19]
Frick

[11] Patent Number: 5,285,235
[45] Date of Patent: Feb. 8, 1994

[54] PHOTOGRAPHIC COPYING APPARATUS AND OPERATING PROCESS

[75] Inventor: Beat Frick, Buchs, Switzerland

[73] Assignee: Gretag Imaging AG, Althardstrasse, Switzerland

[21] Appl. No.: 950,670

[22] Filed: Sep. 25, 1992

[30] Foreign Application Priority Data

Sep. 26, 1991 [EP] European Pat. Off. ........ 91810758.2

[51] Int. Cl.$^5$ .................... G03B 27/46; G03B 27/50
[52] U.S. Cl. ........................................ 355/41; 355/50; 250/561; 250/571
[58] Field of Search .............. 250/548, 559, 571, 561; 352/236, 237; 353/25, 26 R, 26 A; 355/28, 29, 41, 50, 51

[56] References Cited

U.S. PATENT DOCUMENTS

| | | | |
|---|---|---|---|
| 4,140,915 | 2/1979 | Rube et al. | 250/570 |
| 4,864,149 | 9/1989 | Matsumoto | 250/561 |
| 4,947,205 | 8/1990 | Benker et al. | 355/41 |
| 4,987,440 | 1/1991 | Benker et al. | 355/41 |

FOREIGN PATENT DOCUMENTS 3833731  5/1990  Fed. Rep. of Germany ......... G03D 15/00

*Primary Examiner*—Michael L. Gellner
*Assistant Examiner*—Daniel P. Malley
*Attorney, Agent, or Firm*—Burns, Doane, Swecker & Mathis

[57] ABSTRACT

In a photographic copying apparatus for processing exposed photographic film there are recorded in a measuring station, in addition to measurement data relating to the color composition of the negative, also splice events and perforation events and their occurrence on the film. The recorded data are fed to a calculating and evaluation unit and there stored in the form of a table (event table). The occurrence of splice events and perforation events on the film is recorded in one or more repositioning processing stations. Those data are stored in the calculating and evaluation unit in the form of a table (position table). In order to reposition the film in each processing station, the tables are correlated and any deviations established are taken into account when the film is repositioned. In order to detect the perforation and splice events, the measuring station (7) and the processing stations (8, 9) are equipped with perforation- and splice-detectors (72, 73 and 82, 83 and 92, 93, respectively).

18 Claims, 5 Drawing Sheets

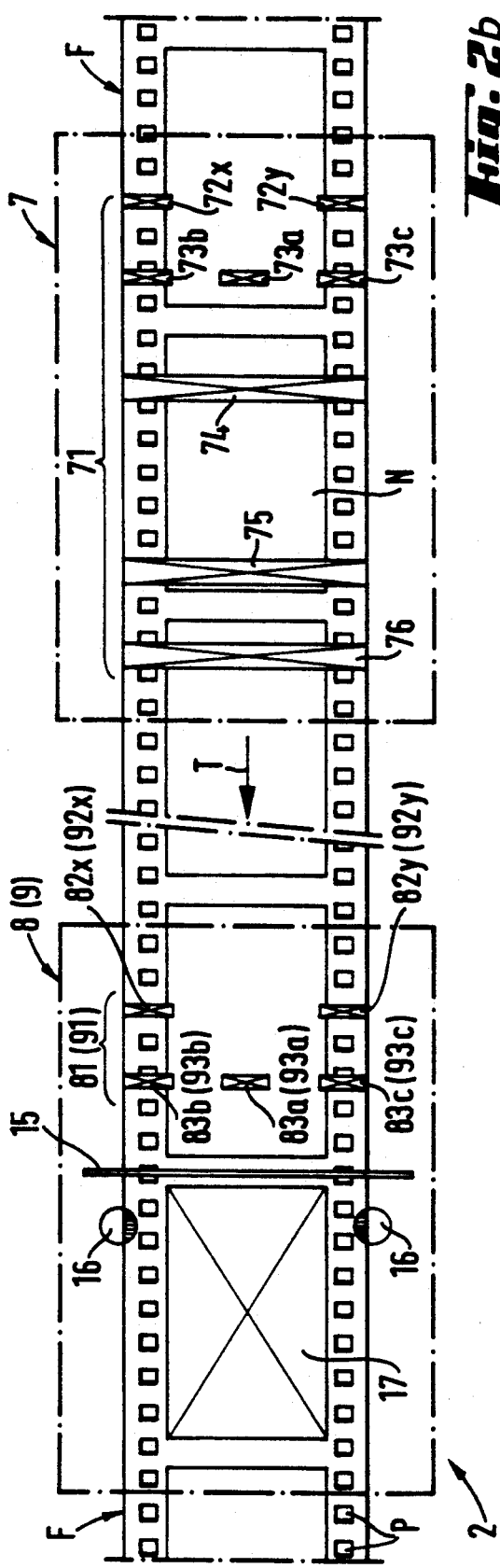
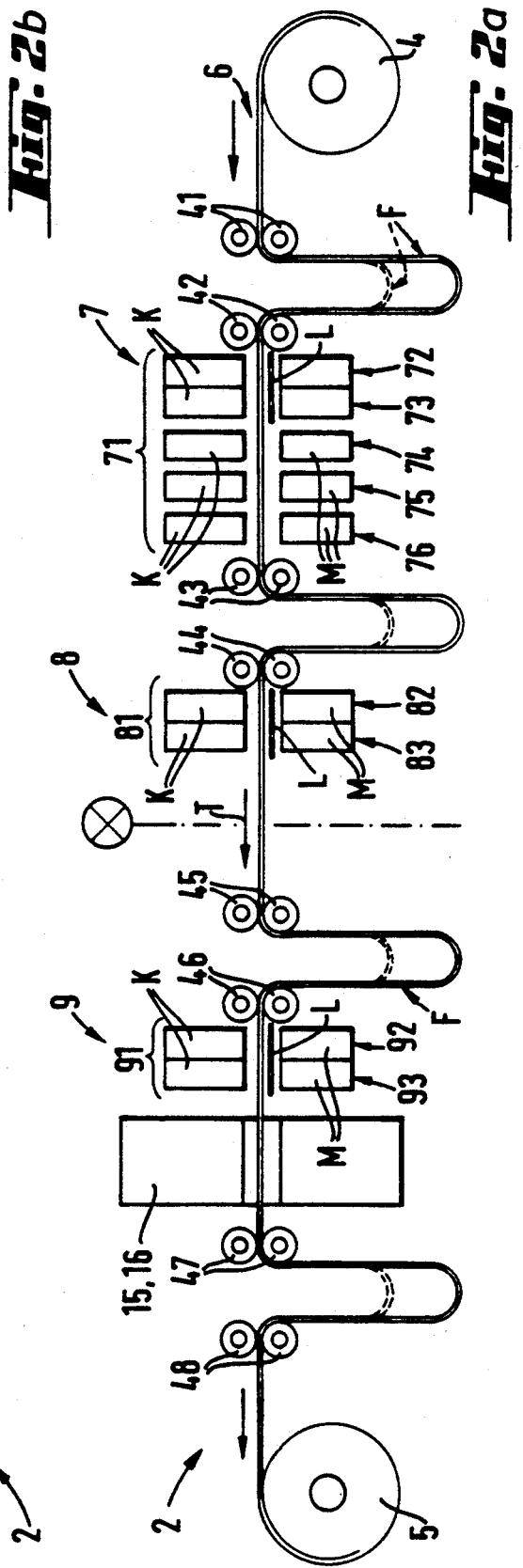
Fig. 2b
Fig. 2a

SPLICE EVENT s
PERFORATIONS EVENT p

E (X)

| LIST OF EVENTS G | | |
|---|---|---|
| STEPS | SPLICE EVENT s | PERFORATIONS EVENT p |
| 55 13 04 | 0 | 1 |
| 55 13 05 | 0 | 0 |
| 55 13 06 | 0 | 0 |
| 55 13 07 | 1 | 1 |
| 55 13 08 | 0 | 0 |
| 55 13 09 | 0 | 1 |
| 55 13 10 | 0 | 0 |
| 55 13 11 | 0 | 0 |
| 55 13 12 | 0 | 1 |

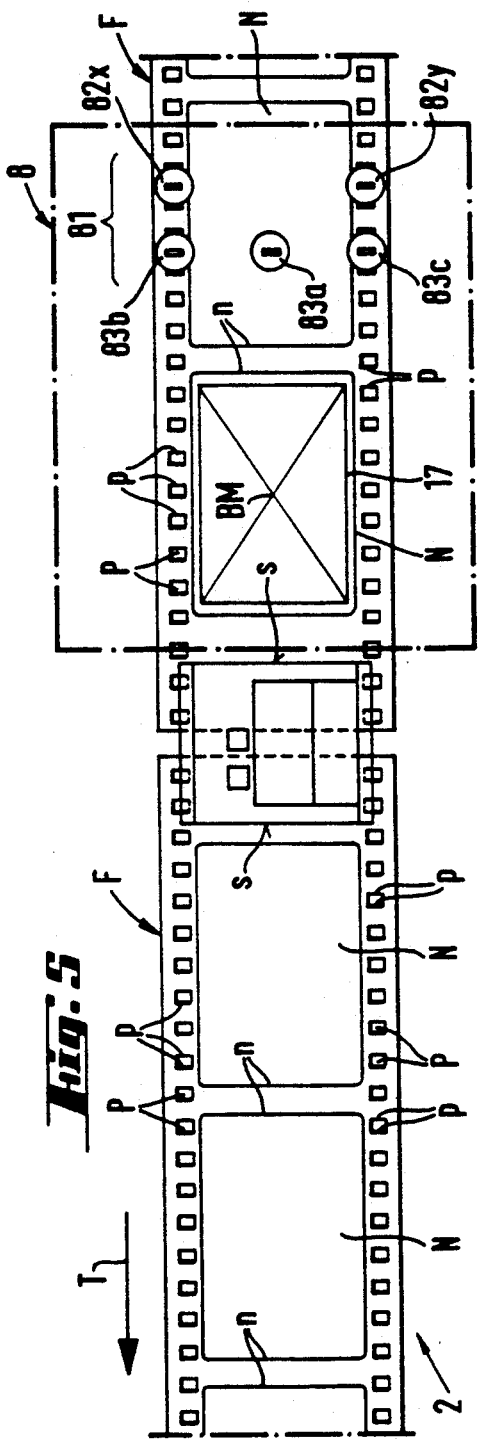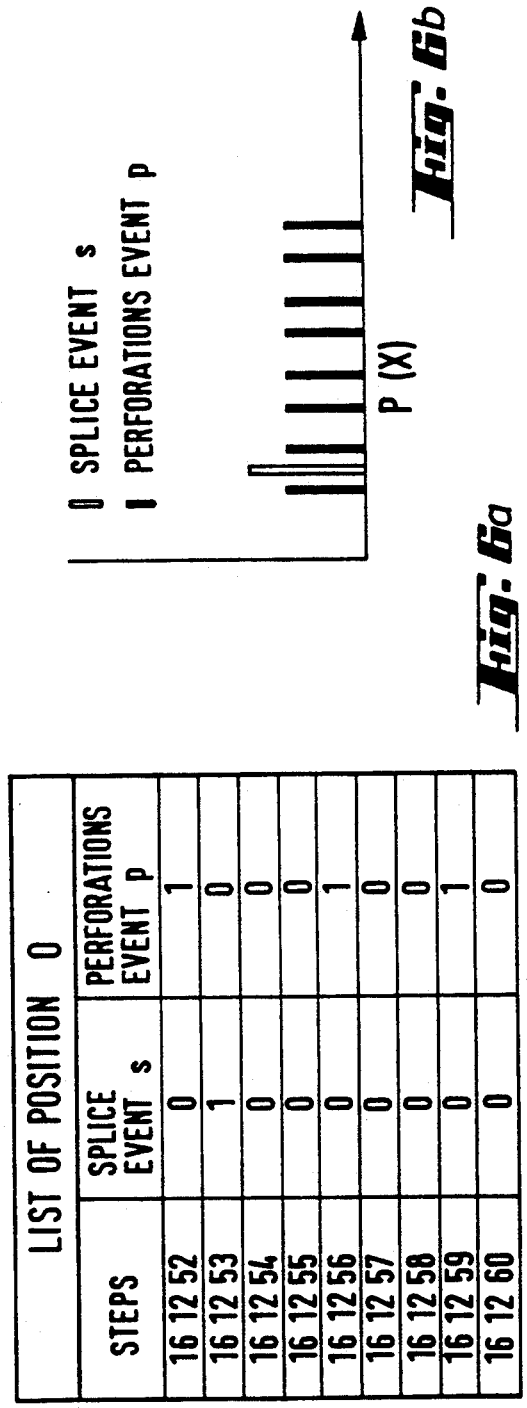

PHOTOGRAPHIC COPYING APPARATUS AND OPERATING PROCESS

BACKGROUND OF THE INVENTION

The invention relates to a photographic copying apparatus and to a process for operating such a copying apparatus.

Photographic copying apparatuses carry out further processing on photographic film that has been developed in a film-developing machine. The photographic film, which generally is not notched, passes through several treatment stations in a so-called film path, for example a measuring station, an exposure station or, finally, a cutting station. In the measuring station, the data required to determine the correct exposure are detected, as is also the position of the data on the film, and the data are fed to a calculating and evaluation station. Then, on the basis of the calculated exposure data, for example for the primary colours red, green and blue, and on the basis of the associated position data on the photographic film, the exposures are carried out in the exposure station. For that purpose, the measurement data obtained in the measuring station must be unambiguously associated with a site on the film and, in the repositioning station, in this case the exposure station, which is separated spatially from the measuring station, that site must be positioned with a very small tolerance. For example, a master on the film (that is to say, for example, a negative image) must be arranged in the region of an exposure window with an acceptable deviation of no more than 0.5 mm. It is obvious that that is no easy undertaking in modern photographic copying apparatuses having high throughput capacities, especially in so-called heavy-duty printers having a processing capacity of 20,000 or more images per hour.

For example, great difficulties arise as a result of tolerances and wear effects of the mechanics of the copying apparatus. The film is generally transported through the film path by friction between the film surface and the transport rollers. Thus, for example, the radius of the film transport rollers may deviate from the nominal radius, both as a result of manufacturing tolerances and as a result of wear caused by abrasion. The roller radius may also vary as a result of the temperature-induced "flexing" of the transport rollers which are provided with a layer of rubber. A further substantial problem, which occurs as early as in the measuring station and which can make itself felt in a detrimental manner also in the further treatment station (for example the exposure station or the cutting station), which is separated spatially from the measuring station, is the slip between the film surface and the transport rollers. Although it is possible to reduce the slip problem by using transport rollers having a very high coefficient of friction, such rollers generally exhibit a very high degree of abrasion which, in turn, see above, changes the roller diameter. Abrasion-resistant transport rollers having smooth surfaces, on the other hand, lead to increased slip. Finally, an increase in the contact pressure of the transport rollers on the film is also only possible to a slight degree because there is a risk that the surface of the film will be damaged.

DE-A-3 833 731 relates to a process for processing developed photographic films and to an apparatus for carrying out that process, which process is intended to eliminate the problems described. In the measuring station, the position of the image fields is ascertained by photoelectric scanning in a measuring slot extending perpendicular to the direction of transport. In a processing station that is displaced with respect thereto by a relatively great film length, the film is processed in spatial association with the image fields ascertained. The transport of the image field from the measuring station to the processing station is controlled on the basis of a measurement of the transported film length. For that purpose, image edges recognised in the measuring station and/or marked changes in density in the region of the image fields are stored with their values and longitudinal co-ordinates. Shortly before reaching the processing station, the film is again scanned for image edges and/or marked changes in density and the associated longitudinal co-ordinates are ascertained. The two scans are compared with one another and, if there are variations in the longitudinal co-ordinates, the path length measuring devices for the second scan are corrected accordingly.

In the case of that process and the apparatus of the prior art, the accuracy of film positioning is based essentially on the accuracy of the detection of an image edge and/or of a marked shift in density in an image field and on the accuracy of the determination of the associated longitudinal co-ordinate on the film. It is known, however, that, when detecting the image edges and/or the marked changes in density within an image field and when recording the associated longitudinal co-ordinates, errors may occur which are on the one hand system-induced and, on the other, are of a statistical nature. In addition to the afore-mentioned deviations of the roller radii of the transport rollers from their nominal value and the temperature-induced "flexing" of the rollers, system-induced errors can occur, for example, as a result of mechanical tolerances of the density-change sensors. The sensors for detecting the longitudinal co-ordinates of the film, usually a counting mechanism for the steps of the motors for the transport rollers, can also contribute to deviations in that qualifying errors on the part of the counting mechanism occur or in that the control electronics do not supply absolutely exact control pulses. Added to those system-immanent errors are, however, also the so-called statistical sources of error. Apart from the afore-mentioned slip, for example the positioning accuracy of the stepping motors for the transport rollers may vary. In many cases, the sensors also have a statistical noise which can distort the detected events or the recorded longitudinal coordinates of the film. All those possible sources of error contribute to the fact that the film cannot always be positioned with the desired accuracy because the apparatus and the process of the prior art are geared to the recording and the recognition of a single event. Furthermore, that known process requires the stepping motors for the film transport rollers in the measuring station and in the repositioning station to be driven at the same rate, but, in many cases, it is desirable for the stepping motors in the repositioning processing station to be driven with a greater step size and at a correspondingly reduced step frequency.

SUMMARY OF INVENTION

The problem of the present invention is accordingly to eliminate those disadvantages of the prior art and to provide a photographic copying apparatus and a process that enable the positioning of the film to be carried out in the repositioning station with a high degree of accuracy, especially in the case of heavy-duty printers having an hourly capacity of 20,000 or more images.

All those and other problems are solved by a photographic copying apparatus and by a process.

According to the invention, a photographic copying apparatus for processing photographic film is provided, which apparatus comprises a measuring station and at least one processing station for the film, which station is separated spatially from the measuring station and, in the direction of film transport, is arranged downstream of the measuring station in the film path, and a calculating and evaluation unit that is connected on the one hand to the measuring station and, on the other, to the processing station. The photographic copying apparatus also has scanning units for the film in the measuring station and in the processing station, which units are likewise connected to the calculating and evaluation unit, and the purpose of which is to examine the film for specific predetermined criteria. Various events are detected on the film on the basis of those criteria and their local occurrence on the film is established. Those data are used to associate events in the measuring station and in the processing station and any necessary correction of the film positioning in the processing station is derived therefrom. The scanning units for the film provided in the measuring station comprise, especially, at least one detector for perforations in the film and a splice-detector, while the scanning units in the processing station comprise a splice-detector and at least one detector for perforations in the film.

Each perforation-detector preferably comprises two sensors for the perforations at the longitudinal edges of the film, which sensors are arranged opposite one another.

It is advantageous if the splice-detectors and the perforation-detectors are separated from one another spatially and if the perforation-detectors are arranged upstream of the splice-detectors, viewed in the direction of film transport.

An especially preferred variant of the splice-detectors comprises one central splice-sensor and two edge sensors which are arranged in a row running perpendicular to the direction of transport of the film and parallel to the plane of the film.

In particular, each perforation- and splice-sensor has a light-emitting diode that is arranged above the film path and a photodiode, provided with a slit diaphragm, that is arranged opposite the light-emitting diode and below the film path.

In the case of photographic copying apparatuses having only one processing station for the film, that station is in the form of an exposure station.

It is especially advantageous, however, especially in the case of fully integrated systems, if the photographic copying apparatus has more than one processing station for the film in the film path, those stations, in the order of their arrangement downstream of the measuring station, being in the form of an exposure station and a cutting station. It is advantageous if the sensors in the individual stations have the same arrangement.

The process for processing developed photographic film having exposed images areas in the copying apparatus according to the invention, in which process the film is analysed in a measuring station arranged in a film path of a photographic copying apparatus, there being determined, in addition to colour separation values for the three primary colours blue, green and red, also the position of the image areas on the film, and in which process the film, for the purpose of further processing, is repositioned in spatial association with the analysed image areas in a processing station that is arranged in the film path in such a manner that it is separated spatially from the measuring station, comprises essentially the following steps:

in the measuring station, the film, in addition to undergoing colour analysis of the image areas, is examined at least for splice edges, perforation edges, image edges and, where appropriate, also for other events, and the occurrence of those events on the film is recorded;

the signals resulting from the detected events are transmitted to a calculating and evaluation unit and stored in the form of an event table;

the further-transported film is examined in the processing station for splice edges and perforation edges, and the occurrence of those events on the film is recorded;

the signals resulting from the detected events are transmitted to a calculating and evaluation unit and stored in the form of a position table;

the tables are compared in respect of the detected splice edges and perforation edges and their recorded occurrence on the film and any deviations established are taken into account when the film, especially the image areas, is repositioned in the processing station.

It is especially advantageous if the current step number of the stepping motors for the film transport rollers in the measuring station and in the processing station are associated with the detected events on the film.

The stepping motors are preferably driven with different step sizes, the stepping motor for the transport roller in the measuring station especially being driven with the smaller step size.

In a very preferred process variant, the image areas are repositioned in the processing station by transporting the film a previously calculated distance further. The calculation of the distance necessary for repositioning is governed by the correlation of the events recorded in the event table and in the position table. The relationship between the recorded step number E, belonging to event X, of the stepping motor for the transport rollers in the measuring station and the detected step number P, belonging to the same event X, of the stepping motor for the transport rollers in the processing station is given by the equation $$P(X) = A \times E(X) + B$$

in which A represents the ratio of the step sizes of the stepping motors in the processing station and in the measuring station and B represents a quantity that is determined essentially by the state of the step-counter for the stepping motors in the starting state of the photographic copying apparatus.

In a refined process variant, during the further transport of the film, in order to reposition the image areas in the processing station, the quantities A and B are continuously re-ascertained and corrected by correlating the position table with the event table.

In the film areas between the splice events, the correction of the quantities A and B is preferably effected by linear regression of several, preferably from 3 to 7, perforation events detected during the repositioning of the image areas.

It is especially advantageous if the transport distance necessary to reposition the following image area is determined with the aid of the relationship, which has been re-ascertained during the positioning of the preceding image area, between the step number ascertained in the measuring station and the step number in the processing station, especially using the quantities A and B ascertained in the process.

The last-ascertained quantities A and B are preferably checked for plausibility and are discarded if their values lie outside a predetermined range of fluctuation. The repositioning of the next following image area, especially the ascertainment of the necessary transport distance, is in those cases advantageously effected using the quantities A and B ascertained from the previous calculation.

In the case of the photographic copying apparatuses preferably used, the film is repositioned in a processing station that is in the form of an exposure station.

In a variant of the photographic copying apparatus according to the invention, the film is repositioned along the film path in several processing stations, a position table for splice and perforation events and the associated step numbers of the relevant stepping motors being ascertained for each individual processing station, the position table being correlated with the event table obtained in the measuring station and, for each image area to be positioned, a linear relationship between the step number in the measuring station and the step number in the relevant processing station being obtained therefrom, which relationship is in turn used to ascertain the transport distance for the approximate repositioning of the following image area in the relevant processing station.

In the above-mentioned especially advantageous variant of the photographic copying apparatus, the film is transported, in the sequence of the repositioning operations in the processing stations, from the measuring station to an exposure station and to a cutting station.

The invention is explained in more detail hereinafter with reference to the representation of an embodiment variant, given by way of example, in the drawings.

BRIEF DESCRIPTION OF THE DRAWINGS

FIG. 2a is a diagrammatic representation of the film portion of the photographic copying apparatus according to FIG. 1 in side view, FIG. 2b is a diagrammatic plan view of the arrangement of the measuring station and the processing station(s) of FIG. 2a, FIG. 3 shows the arrangement of the scanning units in the measuring station, FIG. 4a is an example of an event table written in matrix form, FIG. 4b is an event table in symbol form, FIG. 5 shows the arrangement of the scanning units in the processing station, FIG. 6a is an example of a position table written in matrix form, FIG. 6b is a position table in symbol form and FIG. 7 is a diagram illustrating the process according to the invention.

DETAILED DESCRIPTION OF THE PREFERRED EMBODIMENTS

Figure 1:
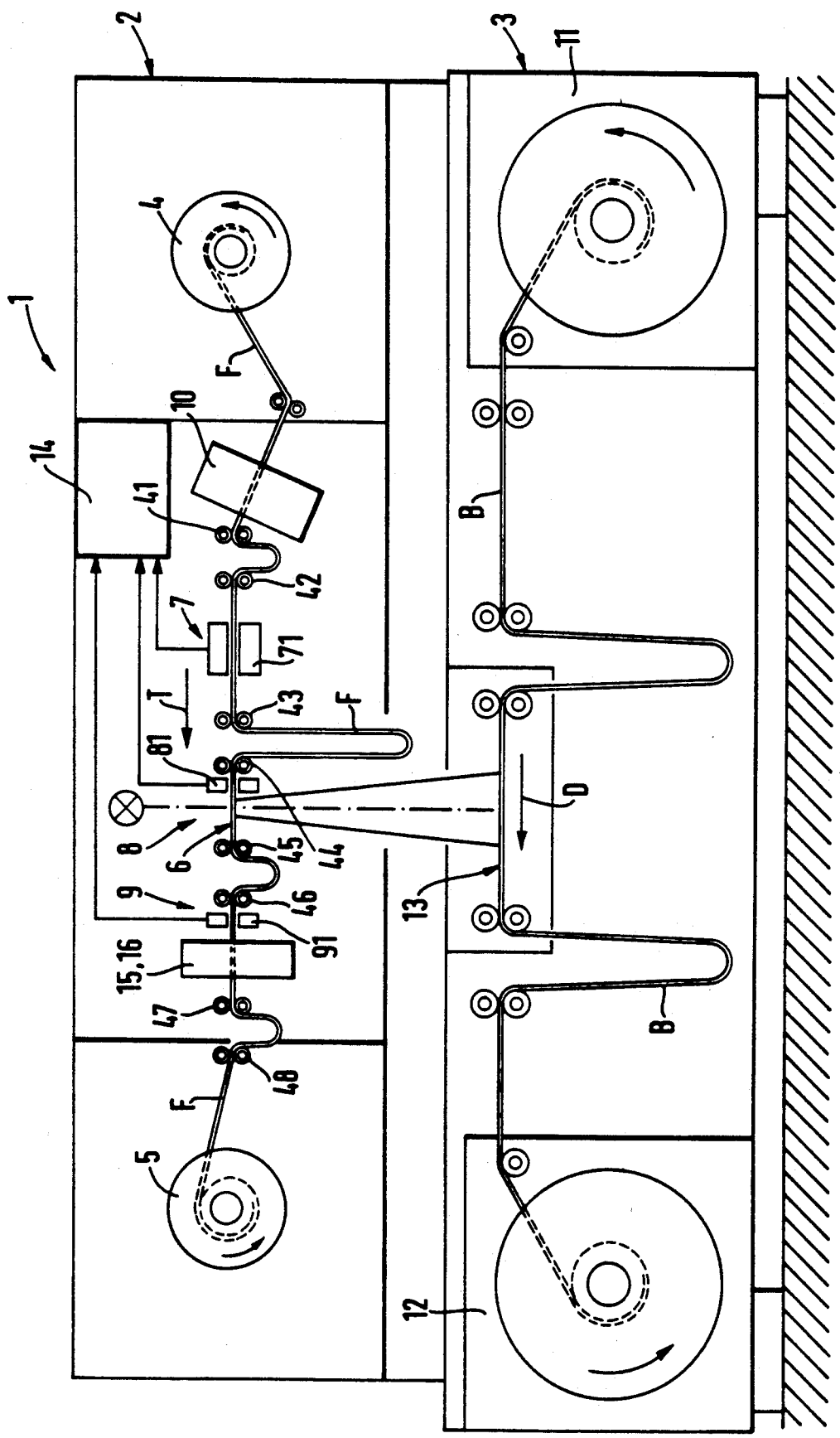
FIG. 1 is a functional representation of a photographic copying apparatus according to the invention.

A photographic copying apparatus 1, shown diagrammatically in FIG. 1, for processing developed photographic films F comprises an essential functional blocks a film portion 2 and a paper portion 3. The film portion 2 comprises a film path 6, along the transport path, for the film F, of which, indicated by the arrow T, a film-cleaning station 10, a measuring station 7 and one or, as in the case of the embodiment shown, several processing stations 8 and 9 are arranged. In addition to the measuring station 7, FIG. 1 shows especially an exposure station 8 and a further processing station 9, which could be, for example, a notching station or a cutting station for the film, or both. The measuring station 7 and each processing station 8 and 9 are equipped with scanning units 71, 81 and 91, respectively, for the film F which are connected to a central calculating and evaluation unit 14 via connecting lines not shown in detail in FIG. 1. Inter alia, the measurement data ascertained by the scanning units 71, 81 and 91 are processed in the calculating and evaluation unit 14 and, for example, the necessary amounts of copying light are ascertained from those data and fed to the exposure station 8. In addition, the measurement data ascertained are also used to obtain information for repositioning the film F in the processing stations 8 and 9, that is to say, on the basis of the ascertained measurement data relating to the local occurrence of specific events on the film F, it is endeavoured to associate events in the measuring station 7 and in the area of the processing station(s) (and 9) and to derive therefrom any necessary corrections to the repositioning in the processing station. As illustrated, a film-cleaning station 10 can also be provided upstream of the measuring station 7 on the input side of the copying apparatus 1. Receiving devices for take-off and take-up spools 4 and 5, respectively, for the films are provided on the input and output side of the copying apparatus 1.

The paper portion 3 of the copying apparatus 1 comprises a paper path 13 which passes under the exposure station. Light-sensitive photographic copying material B, which is wound off from a supply cartridge 11 that can be placed at the input side, is passed under the exposure station 8 in the direction of transport indicated by the arrow D for the purpose of exposure and is transported to a take-up cartridge 12 that can be placed at the output side. Thus far, the copying apparatus according to the invention corresponds to the copying apparatuses of the prior art, for example the apparatus described in DE-A-3 833 731, so that the description hereinafter is limited to the differences in the film portion 2 that are essential to the invention.

FIGS. 2a and 2b show the film portion 2 and the arrangement of the scanning devices 71, 81 and 91 in diagrammatic form. It can be seen (FIG. 2a) that the film F is guided between the individual stations in a loop of variable length provided between film transport rollers 41, 42 and 43, 44 and 45, 46 and 47, 48. FIG. 2a indicates that each of the film transport rollers 41 through 48 is a pair of rollers: a drive roller drivable preferably by a stepping motor and a pressure roller.

The diagrammatic representation of the scanning units 71 and 81 (and 91), in FIG. 2b shows that the scanning units 71, provided in the measuring station 7, for the film F comprise at least one detector 72 for perforations P in the film F and a splice-sensor 73. Furthermore, the scanning units 71 in the measuring station 7 also comprise a detector 74 for the film frames, sensors 75 for the spectral analysis of an image area N and, where appropriate, further detectors, for example a density sensor 76 for establishing the picture quality. The scanning units 81 and 91 in the processing stations 8 and 9, respectively, are arranged upstream of the actual processing devices, viewed in the direction of film transport. The individual processing stations 8 and 9 with their processing devices have not been shown separately in FIG. 2b because they are basically of the same structure. Accordingly, the Figure shows only by symbols that the processing stations are an exposure station 8 (indicated in symbol form by the exposure window 17) or a notching station (indicated by the notching means 16) and a cutting station 9 (indicated in symbol form by a cutting tool 15). The scanning units in the processing stations 8 and 9 are in each case formed by at least one perforation-detector 82 and 92, respectively, and a splice detector 83 and 93, respectively.

It is advantageous if each of the detectors 72, 82 and 92 for the perforations comprises two sensors x, y for the perforations at the longitudinal edges of the film F, which sensors are arranged opposite one another. In that manner, it is possible to detect even perforation events that occur only at one longitudinal edge of the film, for example when the perforations have been glued up at one side or when they have been torn out at one side.

The detectors 72, 73 and 82, 83 and 92, 93 are preferably separated from one another spatially. When viewed in the film transport direction T, the perforation-detectors 72, 82 and 92 are arranged upstream of the splice-detectors 73, 83 and 93. In an especially preferred variant, each splice detector 73, 83 and 93 comprises one central splice sensor a and two edge sensors b and c which are arranged in a row running perpendicular to the transport direction T of the film F and parallel to the plane of the film. In that manner, it is possible both to detect the centrally arranged splices that are generally used nowadays to connect two film orders and reliably to recognise splices provided at the longitudinal edges of the film (so-called edge splices). The preferred structure of the perforation- and splice-sensors is indicated in FIG. 2a. Each sensor comprises, especially, a light-emitting diode K that is arranged above the film path 6 and a photodiode M, provided with a slit diaphragm L, that is arranged opposite the light-emitting diode K and below the film path 6. Sensors having that structure can be integrated in a very compact and space-saving manner at the desired sites on the film path 6.

The photographic copying apparatus 1 according to the invention may comprise, in addition to the measuring station 7, only one processing station, which in that case is in the form of an exposure station 8. In a preferred construction, however, more than one processing station is provided in the film path 6. In the order of their arrangement downstream of the measuring station 7, those processing stations are in the form of an exposure station 8 and a cutting station 9.

In order to process the developed photographic film F having exposed image areas N, the film F is first of all analysed in the measuring station 7 arranged in the film path 6. In the course of that analysis, in addition to the colour separation values for the three primary colours blue, green and red, data relating to the position of the individual image areas N on the film are determined and fed to the calculating and evaluation unit 14 for further processing. In the processing station(s), which is(are) arranged in the film path 6 in such a manner that it(they) is(are) separated spatially from the measuring station 7, the film F is finally repositioned in spatial association with the analysed image areas N for further processing.

The process according to the invention comprises especially the following process steps:

in the measuring station 7, the film F, in addition to undergoing colour analysis of the image areas N, is examined at least for splice edges s, perforation edges p, image edges n and, where appropriate, also for other events, and the occurrence E(X) of those events on the film F is recorded, X representing a splice event s or a perforation event p;

the measurement signals resulting from the detected events are transmitted to the calculating and evaluation unit 14 and stored in the form of an event table G;

the further-transported film F is examined in the processing station(s) 8 (and 9) for splice edges s and perforation edges p, and the occurrence P(X) of those events X on the film is recorded, X representing either a splice event s or a perforation event p;

the measurement signals resulting from the detected events are transmitted to the calculating and evaluation unit 14 and stored in the form of a position table O;

the position table O is correlated with the event table G in respect of the detected splice edges s and perforation edges p and the stored values P(X) and E(X), and any deviations established are taken into account when the film F, especially the image areas N, is repositioned in the processing station(s) 8 (and 9).

The values P(X) and E(X) correspond to the step numbers established at the respective stepping motors for the film transport rollers 43 in the measuring station 7 and the film transport rollers 45 and 47 in the processing station(s) 8 and 9 respectively, shown in FIG. 2.

The stepping motors for driving the film transport rollers 43, 45 and 47 are normally driven with different step sizes. The stepping motor for the film transport roller 43 in the measuring station 7 is preferably driven with a smaller step size than are the stepping motors in the processing stations because, especially, the colour analysis of the image fields N is also carried out in the measuring station and the greater the local resolution the more accurately that analysis can be effected. For example, a stepping motor having a micro-step drive and a step size of from 0.01 to 0.1 mm/step, preferably 0.03 mm/step, is used in the measuring station, while stepping motors having a step size of from 0.2 to 0.3 mm/step, preferably 0.25 mm/step, are used in the processing stations.

FIG. 3 shows the arrangement of the scanning units 72-75 in the measuring station 7, again in symbol form. FIG. 3 shows, especially, two films F that have been spliced together and are being transported in the direction of arrow T through the photographic copying apparatus 1. The perforation edges are marked p, the splice edges are marked s and the image edges are marked n. N indicates the exposed image fields, which are arranged one behind the other on the film F at approximately comparable intervals. The distance between two perforations is generally standardised and is 4.75 mm.

FIG. 4a is an example of an event table G written in matrix form. Only the perforation events p and the splice events s are taken into account in the matrix shown but it will be understood that the matrix has other columns which may include the recorded image edge events n, spectral information, etc.. FIG. 4b is an example of a representation in symbol form of the events recorded in the case of a specific step number E(X) of the stepping motor of the film transport rollers 43 at the input side of the measuring station 7. Again, for the sake of clarity, only the splice events s and the perforation events p are shown in the Figure.

FIG. 5 corresponds substantially to the representation in FIG. 3 except that it shows a processing station, in this case, for example, the exposure station 8 with the detectors 82 and 83 for perforation events p and for splice events s. The exposure station 8 is symbolised by the exposure window 17. It will be understood that the exposure station 8 and the cutting station 9 have comparable structures and differ only in their processing devices 16 and 15, respectively. In particular, it is especially advantageous if the arrangement of the sensors in the individual stations, especially the distance between perforation- and splice-sensors, is selected to be the same.

FIG. 6a shows the position table O written in matrix form. The individual columns of the matrix include the recorded steps of the stepping motor for the film transport rollers 45 of the exposure station 8, and the splice events s and perforation events p detected by the splice-detector 83 and the perforation-detector 82 at the input side of the exposure station 8. FIG. 6b is the representation in symbol form, corresponding to FIG. 4b, of the position table O in dependence on the recorded step number P(X).

In order to reposition in the processing stations 8 and 9 the image areas N analysed in the measuring station 7, the film F is transported a previously calculated distance further. The image center of the image area, especially, is repositioned in the processing station. The associated step number, previously ascertained in the measuring station, of the stepping motor in the measuring station is used as the input data for calculating the necessary transport distance. The relationship between the step number determined in the measuring station and the step number sought in the processing station for the repositioning operation is generally given by a linear equation. Especially the relationship between the step number E(X) of the stepping motor for the associated transport rollers 43, which step number belongs to an event X in the measuring station 7, and the step number P(X) of the stepping motor for the transport rollers 45 and 47 in the processing station 8 and 9, respectively, which step number is recorded during the detection of that same event in the processing station 8 and 9, is given by the equation $$P(X) = A \times E(X) + B.$$

In this equation, A represents the ratio of the step sizes of the stepping motors in the relevant processing station 8 or 9 and in the measuring station 7. B represents a quantity that is determined essentially by the state of the step-counter in the starting state of the photographic copying apparatus.

The ratio of the step sizes of the stepping motors is known and is initially regarded as an apparatus constant. During the further transport of the film F, in order to reposition the image areas N in the processing station 8 and 9, the quantities A and B are continuously re-determined by correlating the position table O with the event table G.

The ascertaining of the quantities A and B is effected in several stages with increasing accuracy. When the photographic copying apparatus 1 is switched on, the step-counters of the stepping motors for the transport rollers 43, 45 and 47 are set to zero. A first approximation of the quantity B can then be effected, for example, by detecting the leading film end. That can be effected by means of a signal on passing a light barrier or by synchronising the speeds of rotation of transport rollers 42, 43 and 44, 45 and 46, 47. The step number E(X) and P(X) of the associated stepping motor at the moment of synchronisation is recorded in each station 7, 8 and 9. The quantity B is ascertained to a first approximation from those step numbers, and from the knowledge of the ratio of the step sizes and of the linear relationship between the step number in the measuring station 7 and in the relevant processing station 8 or 9. The accuracy of the value B is determined by the accuracy with which the leading end of the film is detected and is relatively inexact, especially when derived from the synchronisation of the associated film transport rollers.

A second, distinctly more accurate determination of the quantity B is effected by comparing the step numbers E(X), P(X) at the moment of detecting a splice edge s. That is generally effected with an accuracy of approximately +/−0.5 mm which, in the processing station 8 and 9 at a step size of, for example, 0.25 mm/step, corresponds to a positioning accuracy of +/−2 steps.

Between the splice events s, the perforation events p detected in the measuring station 7 and in the processing station 8 and 9 are taken as the governing factor in order to determine the quantity B more accurately and also to check the apparatus constants A. The event table G ascertained in the measuring station 7, especially the step numbers E(X) of the stepping motor for the transport rollers 42 at the input side of the measuring station 7, which step numbers belong to the perforation events p, are correlated with the events X detected in the processing station 8 and 9 in accordance with the relationship between the step numbers P(X) and E(X). In particular, a compensation calculation is carried out using the last 3 to 7 perforation events detected in the processing station during the repositioning of the image area, especially the central area BM of the image, and using the last perforation events detected in the measuring station before the desired target position is reached. The values for the quantities A and B freshly ascertained in this linear regression are used to reposition the next image area N and so on. It must be borne in mind that, owing to the ambiguous association of the last 3 to 7 perforation events of the two stations, the value for B is ambiguous. That is taken into account by a selection criterion described hereinafter with reference to FIG. 7. The plausibility of the values A and B, especially that of the multiplier A, is, however, checked, for example by a comparison with the apparatus-specific step size ratio in the ideal state of the photographic copying apparatus. If it is established that the last values calculated for A and B lie outside a predetermined tolerance range, then the last correlation is ignored and the repositioning of the next image area is carried out using the values from the previous correlation.

Figure 7:
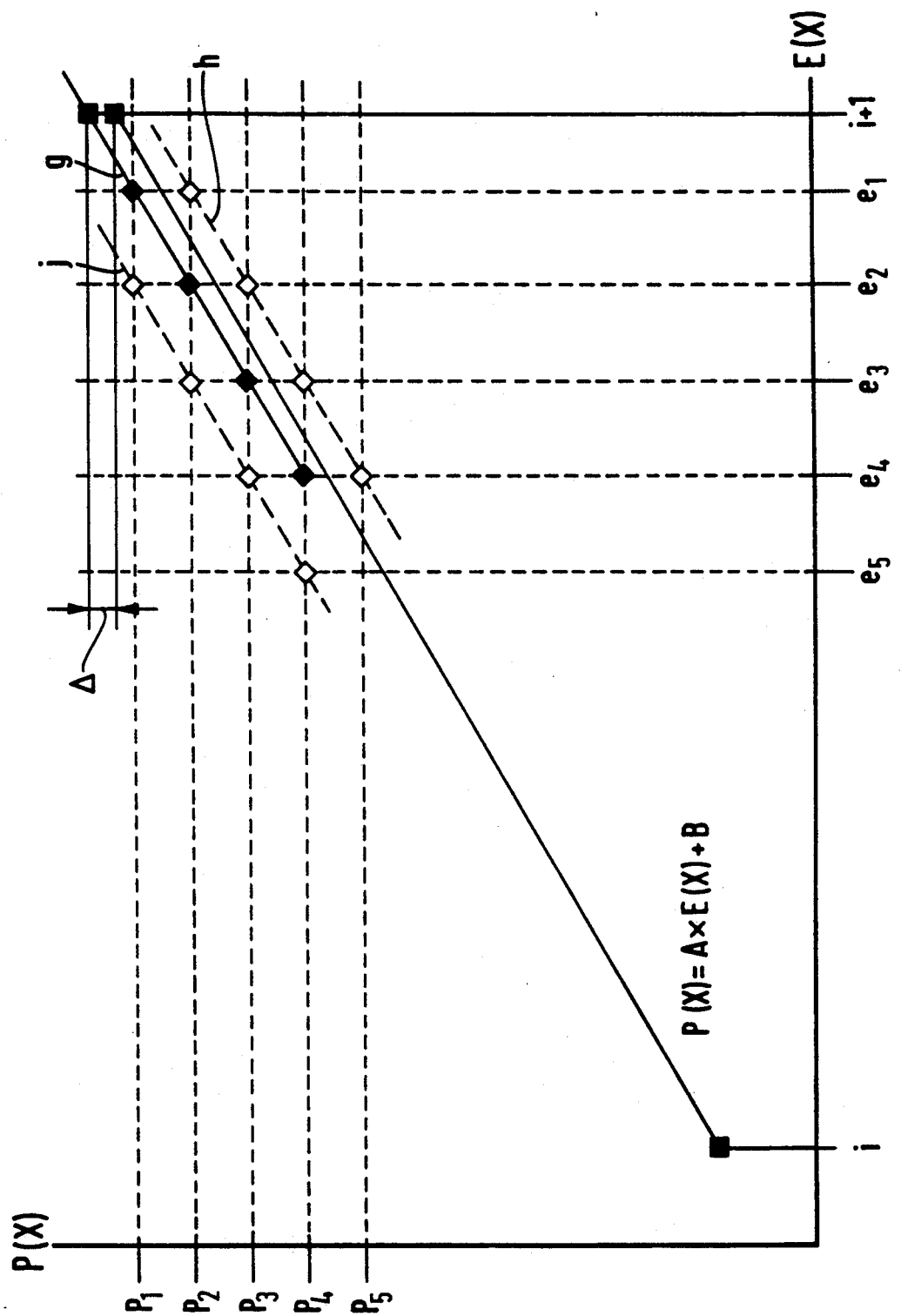

The linear regression process used is shown in symbol form in FIG. 7. The letter i indicates the nominal step number of the i-th image in the measuring station 7. i+1 indicates the nominal position or the nominal step number of the image i+1. The straight connecting line between i and i+1 corresponds to the straight line equation with the values A and B ascertained during the positioning of the i-th image area. The straigth line g is the best approximation to the straight line through the points of intersection of the last four events $e_1$–$e_4$ in the measuring station and in the processing station $p_1$–$p_4$ detected before the nominal position is reached. The straight lines h and j represent analogous approximations for the points of intersection of the events $e_1$–$e_4$ with $p_2$–$p_5$ or $e_2$–$e_5$ with $p_1$–$p_4$, respectively. It can be seen that the straight line h exhibits the smallest deviations with respect to the straight connecting lines and, accordingly, the value B, especially, is closest to the previously ascertained value. Thus, the quantities A and B for the next repositioning operation are obtained from the course of the straight lines g. The positioning error $\Delta$ is generally smaller than one step of the stepping motor for the transport rollers 45 and 47 in the processing station, so that very accurate repositioning can be effected.

The process according to the invention and the apparatus according to the invention make it possible to compensate for both system-immanent and statistical errors in the repositioning operation. Repositioning in the processing station(s) is very accurate. The repositioning error is generally less than the step size of the stepping motors for film-transport in the processing stations. The process operates very rapidly and can be used especially advantageously together with so-called heavy-duty printers.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A photographic copying apparatus for processing photographic film comprising: a measuring station; at least one processing station for the film which station is separated spatially from the measuring station in the direction of film transport and downstream of the measuring station in a film path; a calculating and evaluation unit that is connected to the measuring station and to the processing station; and scanning units for the film in the measuring station and in the processing station, which units are likewise connected to the calculating and evaluation unit to examine the film for specific predetermined criteria; to thereby detect events on the film and to establish their occurrence on the film such that events in the measuring station and in the processing station can be associated and any necessary correction of the film positioning in the processing station derived therefrom, wherein the scanning units for the film provided in the measuring station further comprise at least one detector for perforations in the film and a splice-detector, and the scanning units in the processing station further comprise at least one detector for the perforations in the film and a splice-detector.

2. A photographic copying apparatus according to claim 1, wherein each of the scanning units comprises two sensors for the perforations at the longitudinal edges of the film, which sensors are arranged opposite one another.

3. A photographic copying apparatus according to claim 2, wherein the splice-detectors and the perforation-detectors are separated from one another spatially and the perforation-detectors are arranged upstream of the splice-detectors as viewed in the direction of film transport.

4. A photographic copying apparatus according to claim 3, wherein each splice-detector comprises one central splice-sensor and two edge sensors which are arranged in a row running perpendicular to the direction of transport of the film and parallel to the plane of the film.

5. A photographic copying apparatus according to claim 4, wherein each of said perforation-sensors and each of said splice-sensors has a light-emitting diode that is arranged above the film path, and a photodiode, provided with a slit diaphragm, that is arranged opposite the light-emitting diode and below the film path.

6. A photographic copying apparatus according to claim 1, wherein the processing station for the film is an exposure station.

7. A photographic copying apparatus according to claim 1, wherein additional processing stations for the film are arranged in the film path, which additional stations, in an order of their arrangement downstream of the measuring station, include an exposure station and a cutting station.

8. A process for processing developed photographic film having exposed image areas, comprising the steps of: analyzing the film in a measuring station arranged in a film path of a photographic copying apparatus; determining in addition to color separation values for three primary colors blue, green and red, a position of image areas on the film; repositioning the film in spatial association with the analysed image areas in a processing station that is arranged in the film path in such a manner that it is separated spatially from the measuring station;
examining the film in the measuring station at least for splice edges, perforation edges, image edges and, where appropriate, also for other events, and recording the occurrence of those events on the film, X representing a splice event or a perforation event;
transmitting the signals resulting from the detected events to a calculating and evaluation unit and storing the signals as an event table;
examining the further-transported film in the processing station for splice edges and perforation edges, and recording the occurrence of those events on the film, X representing a splice event or a perforation event;
transmitting the signals resulting from the detected events to a calculating and evaluation unit and storing the signal as a position table;
correlating the position table and the event table with respect to the detected splice edges and perforation edges and their recorded occurrence (P(X) and E(X) on the film, and taking any deviations established into account when the film is repositioned in the processing station.

9. A process according to claim 8, wherein current step number of stepping motors for the film transport rollers in the measuring station and in the processing station are associated with detected events.

10. A process according to claim 9, wherein the stepping motors are driven with different step sizes, a stepping motor for the transport roller in the measuring station being driven with smaller step size than the remaining stepping motors.

11. A process according to claim 10, wherein the image areas are repositioned in the processing station by transporting the film a previously calculated distance further, the calculation of necessary transport distance being governed by the correlation of the events recorded in the event table and in the position table, and the relationship between the recorded step number of an event X of the stepping motor for the transport rollers in the measuring station and a detected step number of the same event X of the stepping motor for the transport rollers in the processing station being given by the equation:

$$P(X) = A \times E(X) + B$$

in which A represents a ratio of the step sizes of the stepping motors in the processing station and in the measuring station and B represents a quantity that is determined essentially by a state of a step-counter for the stepping motors in a starting state of the photographic copying apparatus.

12. A process according to claim 11, wherein during further transport of the film, in order to reposition the image areas in the processing station, the quantities A and B are continuously re-ascertained and corrected by correlating the position table with the event table.

13. A process according to claim 12, wherein, in film areas between the splice events, the correction of the quantities A and B is effected by linear regression of from 3 to 7 perforation events detected during an approximate repositioning of the image areas.

14. A process according to claim 13, wherein the transport distance necessary for the approximate repositioning of the following image area is determined using a relationship which has been re-ascertained during the positioning of the preceding image area, between the step number ascertained in the measuring station and the step number in the processing station, using the corrected quantities A and B.

15. A process according to claim 14, wherein last-ascertained quantities A and B are checked for plausibility and are discarded if their values lie outside a predetermined range of fluctuation, and then repositioning of a next following image area by ascertaining necessary transport distance, is effected using the quantities A and B ascertained from the previous calculation.

16. A process according to claim 8, wherein the film is repositioned in a processing station that an exposure station.

17. A process according to claim 16, wherein the film is repositioned along the film path in several processing stations, a position table for splice and perforation events and an associated local position on the film being determined for each individual processing station, the position table being correlated with the event table obtained in the measuring station and, for each image area to be repositioned, a corrected linear relationship between a step number in the measuring station and a step number in the processing station is obtained therefrom, which relationship is in turn used to ascertain a transport distance for approximate repositioning of a following image area in a processing station.

18. A process according to claim 17, wherein the film is transported, in a sequence of repositioning operations in the processing stations, to an exposure station and to a cutting station.

* * * * *